United States Patent [19]

Ong et al.

[11] Patent Number: 4,835,081

[45] Date of Patent: May 30, 1989

[54] PHOTORESPONSIVE IMAGING MEMBERS WITH ELECTRON TRANSPORT OVERCOATINGS

[75] Inventors: Beng S. Ong, Mississauga; Barkev Keoshkerian, Willowdale; Dasarao K. Murti, Mississauga, all of Canada

[73] Assignee: Xerox Corporation, Stamford, Conn.

[21] Appl. No.: 882,117

[22] Filed: Jul. 3, 1986

[51] Int. Cl.⁴ .............................................. G03G 5/14
[52] U.S. Cl. ........................................ 430/59; 430/58; 430/66; 430/900
[58] Field of Search ...................... 430/58, 59, 66, 900

[56] References Cited

U.S. PATENT DOCUMENTS

| | | |
|---|---|---|
| 3,896,184 | 7/1975 | Bergfjord et al. |
| 3,928,034 | 12/1975 | Regensburger |
| 4,007,043 | 2/1977 | Stolka et al. |
| 4,063,947 | 12/1977 | Pochan et al. |
| 4,075,012 | 2/1978 | Turner et al. |
| 4,264,695 | 4/1981 | Kozima et al. ............... 430/900 X |
| 4,474,865 | 10/1984 | Ong et al. ............... 430/58 |
| 4,535,042 | 8/1985 | Kitayama et al. ............... 430/900 X |
| 4,562,132 | 12/1985 | Ong et al. ............... 430/59 |

Primary Examiner—Roland E. Martin
Attorney, Agent, or Firm—Eugene O. Palazzo; Judith L. Byorick

[57] ABSTRACT

Disclosed is an imaging member comprised of a photoconductive layer, and a protective electron transport polymer overcoating of the formula

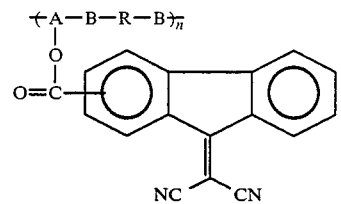

wherein A is a trivalent linkage; B is a functional group such as ester, carbonate, or carbamate; and R is a bivalent linkage.

31 Claims, 6 Drawing Sheets

PHOTORESPONSIVE IMAGING MEMBERS WITH ELECTRON TRANSPORT OVERCOATINGS

BACKGROUND OF THE INVENTION

This invention is generally directed to imaging members, and more specifically the present invention relates to the use of certain electron transporting compounds which function as protective overcoatings for photoresponsive imaging members. In one embodiment, the present invention relates to an imaging member comprised of an inorganic photoconductive composition, and coated thereover electron transport polyurethane polymers. Also, in another embodiment of the present invention, there are provided imaging members comprised of a photogenerating layer, a hole transport layer, and overcoated thereover as an electron transporting protective overcoating a polyurethane polymer. The aforementioned imaging members are useful in electrostatographic imaging processes, and in particular, can be selected for the generation of latent images in electrostatic imaging systems.

The specific electron transport overcoating polyurethane polymers of the present invention, when selected for the imaging members, disclosed perform a variety of functions inclusive of providing protection for the aforementioned members from abrasive physical and chemical contamination. Accordingly, thus for example, the overcoating polyurethane polymers of the present invention permit the resulting imaging member to be resistant to ozone and other chemical substances produced by corona charging devices. Also, the polyurethane electron transport overcoating polymers of the present invention substantially eliminate undesirable scratching of the imaging members involved, and further these coatings can function as release materials permitting the excellent removal and transfer of toner images. Futhermore, the polyurethane electron transport coatings of the present invention can be easily formulated as discrete layers and remain essentially nonreactive to the ink/solvent formulation utilized for certain liquid ink xerographic development processes. Moreover, the protective electron transporting overcoatings of the present invention are non-toxic and are, therefore, inert to users of the device.

It is known that the application of protective coatings to certain photoconductive materials, particularly inorganic photoconductive materials, is designed primarily for the purpose of extending the useful life of the resulting devices. Generally, in order for these coatings to provide the desired protection they should possess certain mechanical properties, and must be applied in a substantially uniform thickness. Additionally, the coating material should be selected so as to not adversely affect the photoelectric properties of the photoreceptor, for example, the coating should not appreciably inject charges in the dark. The protective coatings should also not conduct laterally on the overcoat surface. Further, in some applications the coating must be transparent, and possess a dark resistivity at least equal to the dark resistivity of the photoconductive material. For example, photoconductive materials such as selenium have a resistivity in the dark of $10^{10}$–$10^{12}$ ohm-cm, thus the dark resistivity of the protective coating should be in this range when it is used as a protectant for selenium. In addition, the coatings should not be sensitive to changes in humidity and temperature otherwise the photoelectric properties of the protected photoreceptors will change with humidity.

With regard to vitreous selenium, the most widely used photoconductive material, it suffers from two serious defects, namely, its spectral response is somewhat toward the blue or near ultraviolet, and the preparation of uniform films of vitreous selenium has required highly complex processes wherein critical parameters are involved. Accordingly, from a commercial economic aspect, it is important that xerographic selenium devices be utilized for numerous imaging cycles. The overcoatings of the present invention enable this objective to be achieved.

Deterioration by mechanical abrasion attendant to the developing and the cleaning processes, wherein in one cleaning process a rapidly rotating brush contacts the photoconductive surface for the purpose of removing therefrom any residual developer particles adhering thereto subsequent to the transfer step, has been observed in selenium. In addition to mechanical abrasion, the selenium photoreceptor may be subjected to intense heat, which over a period of time adversely effects its photoconductivity. Accordingly, and for other reasons inclusive of preventing crystallization of selenium upon exposure to solvent vapors, various protective coatings, or overcoatings have been applied to selenium devices. Thus, there is described in U.S. Pat. No. 3,397,982 an electrostatographic device comprising a photoconductive layer including an inorganic glass material, the photoconductive layer containing an overcoating comprised of various oxides, such as germanium oxides, the oxides of vanadium, and silicon dioxide.

Additionally, in U.S. Pat. No. 2,886,434 there are disclosed processes for the protection of selenium photoconductive substances with a thin transparent film of a material having electrical characteristics equal to selenium. Examples of materials disclosed as a protective layer for selenium include zinc sulfide, silica, various silicates, alkaline earth fluorides, and the like. Furthermore, there is disclosed in U.S. Pat. No. 2,879,360 a photoconductor comprising a support substrate, a layer of photoconductive material, and as a protectant a thin film of silicon dioxide superimposed upon the photoconductive layer.

Also, there are illustrated in the prior art photoresponsive devices comprised of a conductive substrate, overcoated with a hole injecting layer, which in turn is overcoated with a hole transport layer, followed by a carrier generating layer, and an insulating organic resin as a top coating. These devices have been found to be very useful in various imaging systems, and have the advantage that high quality images are obtained with the overcoating acting primarily as a protectant. Another similar overcoated photoresponsive device is comprised of a conductive substrate layer, a generating layer, and a transport layer. In such devices, the generating layer can be overcoated on the transport layer, or the transport layer may be overcoated on the generating layer. Examples of such devices are described in U.S. Pat. No. 4,265,990, the disclosure of which is totally incorporated herein by reference.

Additionally, there is disclosed in U.S. Pat. No. 4,423,131, entitled Photoresponsive Devices Containing Polyvinylsilicate Coatings, improved photoresponsive imaging members with a protective overcoating top layer of a crosslinked polyvinylsilicate resulting from the reaction of polysilicic acid with a polyvinyl alcohol with a number average molecular weight of from about 10,000 to about 100,000.

Several of the above-described overcoated organic photoresponsive devices are not effectively protected after extended usage, and in some instances the imaging properties thereof are adversely affected subsequent to a few imaging cycles. More specifically, with these devices the properties of the top overcoating material, or the properties of the other layers are adversely effected by ozone, and other contaminants present in the environment by the developing compositions which contact the photoresponsive device for the purpose of rendering the image visible, and mechanical abrasion during cycling. Accordingly, images of low quality, or no images whatsoever are produced depending upon the extensiveness of the damage caused to the layers of the photoconductive device selected. Furthermore, in some instances, the toner materials employed do not sufficiently release from the photoresponsive surface, leaving unwanted toner particles thereon causing them to be subsequently embedded into, or transferred from the imaging surface in later imaging steps thereby resulting in undesirable images of low quality, and/or high background. Also, in some instances, the dried toner particles adhere to the imaging member and print out as background areas. This can be particularly troublesome when known silicone resins or elastomeric polymers are employed as overcoating materials for their melted toner release characteristics, since any low molecular weight components contained in these polymers can migrate to the surface of the silicone polymer layer, and act as an adhesive for dry toner particles brought in contact therewith during image development. There thus results undesirable high background areas in the final image since toner particles together with the developed images are effectively transferred to the receiving sheet.

Furthermore, disclosed in a copending application U.S. Ser. No. 672,749, entitled Photoresponsive Imaging Members Containing Electron Transport Overcoatings, are imaging members comprised of a supporting substrate, a hole transport layer comprised of an arylamine hole transporting compound dispersed in an inactive resinous binder, a photogenerating layer comprised of a photogenerating pigment optionally dispersed in a resinous binder, and as a protective topcoating an electron transporting layer compound of the following formula dispersed in a resinous binder

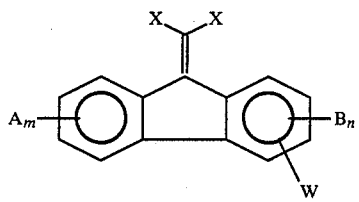

where X is cyano or alkoxycarbonyl groups, A and B are electron withdrawing groups, m is a number of from 0 to 2, n is the number 0 to 1, and W is an electron withdrawing group selected from the groups consisting of acyl (COR), alkoxycarbonyl (COOR), alkylaminocarbonyl (CONHR), and derivatives thereof.

Furthermore, other prior art includes U.S. Pat. Nos. 4,474,865, which describes improved photoresponsive imaging members with electron transporting components containing specific dicyano fluoro ester moieties; 3,928,034, which illustrates the incorporation of electron transporting moieties chemically attached to polymers, reference columns 7 and 8; and 4,007,043; 4,063,947; 4,075,012; and 3,896,184.

While the above-described imaging members disclosed are suitable for their intended purposes, there continues to be a need for improved protective overcoatings for incorporation into layered imaging members. More specifically, there continues to be a need for protective overcoatings which simultaneously function as electron transporting media enabling the resulting photoresponsive imaging members to be useful in xerographic imaging processes, particularly color processes, in that the members can be positively charged. Additionally, there continues to be a need for improved layered devices wherein the protective overcoating is comprised of a polymer based on the electron transporting 9-fluoroenylidenemethane structure. These coatings possess excellent toner release properties, and are impermeable to chemical materials produced by corona charging devices. Also, there continues to be a need for insulating protective overcoatings which simultaneously function as an electron transporting media, and wherein these overcoatings are not conductive to charges applied by a corona charging device. Furthermore, there remains a need for electron transport overcoatings which are mechanically strong and durable while simultaneously being insensitive to the effect of humidity. Also, there is a need for heat resistant overcoatings for layered photoresponsive imaging members which are capable of protecting these members from direct exposure to heat without adversely affecting their imaging performance. There also remains a need for protective overcoatings which prevent the escape of toxic materials, especially inorganic materials such as arsenic and tellurium from photoreceptor imaging members. Moreover, there is a need for protective overcoatings that will prevent photoconductors such as selenium from crystallization upon exposure to solvent vapors.

Further, there continues to be a need for new protective overcoatings for inorganic photoconductive members inclusive of members comprised of selenium and selenium alloys. Also, there is a need for reliable single component protective overcoatings for layered imaging members, which coatings have several desirable characteristics including toughness, high durability, and enable the transporting of electrons.

SUMMARY OF THE INVENTION

It is an object of the present invention to provide an improved photoresponsive imaging member which overcomes many of the above-noted disadvantages.

In a further object of the present invention there are provided electron transport polymer overcoatings for photoresponsive imaging members, which overcoatings are chemical, heat and abrasion resistant, and simultaneously transport electrons.

In another object of the present invention there are provided layered photoresponsive imaging members with a photogenerating composition and coated thereover as a protective overcoating electron transport polymers.

In yet a further object of the present invention there are provided layered photoresponsive imaging members containing as overcoatings dispersions of specific electron transport polymers, especially polyurethanes, in resinous binders, which overcoatings are insulating and are thus not conductive or leaky to charges applied by a corona charging device.

In still another object of the present invention there are provided phtoresponsive imaging members, inclusive of those comprised of selenium and selenium alloys, comprised of protective electron transport polymers, which members are useful for generating electrostatic latent images, particularly colored images in xerographic imaging processes.

Another object of the present invention resides in the provision of humidity insensitive electron transporting polyurethane protective overcoatings for inorganic photoresponsive imaging members.

Another object of the present invention resides in the provision of single component polymeric overcoatings for photoreceptors, which overcoatings are environmentally safe, and are inert to the users of the devices.

These and other objects of the present invention are accomplished by the provision of photoresponsive imaging members having incorporated therein as protective overcoatings electron transporting polymers. More specifically, in one embodiment of the present invention there are provided inorganic photoresponsive imaging members having incorporated therein as protective overcoatings electron transporting polycondensation polymers derived from the polycondensation of 2,2-bis(hydroxymethyl)butyl 9-dicyanomethylenefluorene-4-carboxylate, and diisocyanate. Also encompassed within the scope of the present invention are layered photoresponsive imaging members comprised of a supporting substrate, a photoconductive layer, an arylamine hole transport layer, and a protective electron transporting overcoating layer comprised of the polymers described hereinabove. In addition, the electron transport polymers of the present invention are useful as the top overcoatings for positive-charging layered photoresponsive devices comprised of a supporting substrate, a hole transport layer, and a photoconductive layer.

The novel overcoating polymers selected for the imaging members of the present invention are preferably of the formula

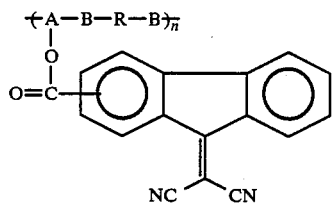

wherein A is a trivalent linkage; B is a functional group such as an ester (—OCO—), a carbonate (—OCOO—) or a carbamate (—0CONH—); and R is a bivalent group, and wherein n represents the number of repeating units, for example, from about 25 to about 300.

Illustrative examples of trivalent aliphatic linkages A include 2-methylenepropylene, 2-methylene-2-methylpropylene, 2-methylene-2-ethylpropylene, N,N,N,-triethyleneamine, and the like. Illustrative examples of trivalent aromatic linkages A include those of from 6 to about 24 carbon atoms, such as $C_6H_3$, $C_7H_5$, $C_8H_7$, $C_{10}H_5$, and the like. Examples of the bivalent radical R are polymethylene groups, phenylene, tolylene, and the like. Preferred polymethylene groups include those containing from 1 to 20 carbon atoms such as methylene, ethylene, trimethylene, tetramethylene, pentamethylene, hexamethylene, and the like.

Illustrative specific examples of novel electron transport overcoating polymers include those encompassed by the formulas illustrated in FIGS. 1 through 10.

The electron transporting polyesters of FIGS. 1 and 2 are prepared, reference scheme 1, by the polycondensation of a suitably functionalized diol (1) such as, for example, 2,2-bis(hydroxymethyl)butyl 9-dicyanomethylenefluorene-4-carboxylate, (1a) with a diacyl halide or a diester (2a).

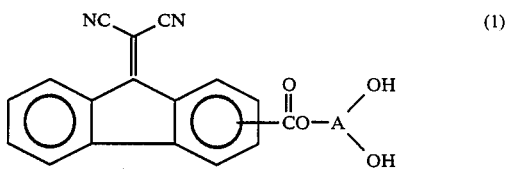

SCHEME 1

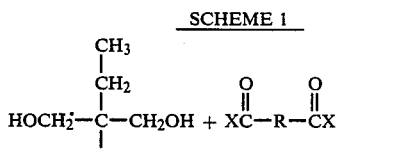

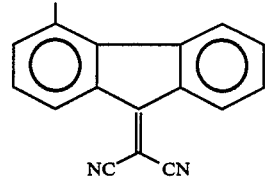

(2a) X = halide or alkoxide

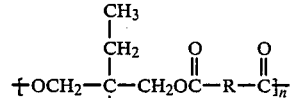

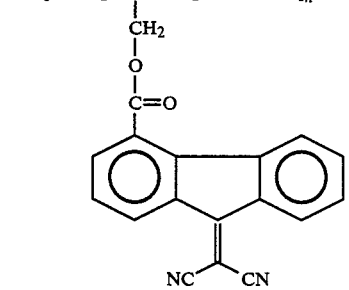

The polyesterification reaction is generally carried by melt polymerization at reduced pressure at a temperature ranging from 50° C. to about 200° C. depending on the reagent used. However, with a diacyl halide reagent, the polymerization can be carried out in solution at ambient temperature in the presence of a base such as pyridine or trialkylamine. Examples of suitable solvents for solution polymerization include dicloromethane, 1,2-dichloroethane, tetrahydrofuran, dioxane and the like. Diacyl halides that may be employed for the reaction include succinyl chloride, glutaryl chloride, pimeloyl chloride, suberoyl chloride, azelaoyl chloride, fumaryl chloride, phthaloyl chloride, isophthaloyl chloride, terephthaloyl chloride, and the like. In general, stoichiometric quantities of the reactants are employed, and for each mole of the diol, 1 to 3 mole of a base is employed.

Similarly, polycarbonates such as those represented by FIGS. 3, 9 and 10 are synthesized by polycondensation of diol (1) with a bishaloformate, phosgene, a dialkyl or diaryl carbonate. The polymerization can be affected either by melt polymerization under reduced pressure in the presence of a suitable catalyst or by solution polymerization depending on the nature of reagents used. For example, polycondensation of an appropriately functionalized bisphenol (1b) and a bischloroformate (3a) is conducted in a suitable solvent at 10°–30° C. in the presence of a base such as pyridine in accordance with the following reaction scheme:

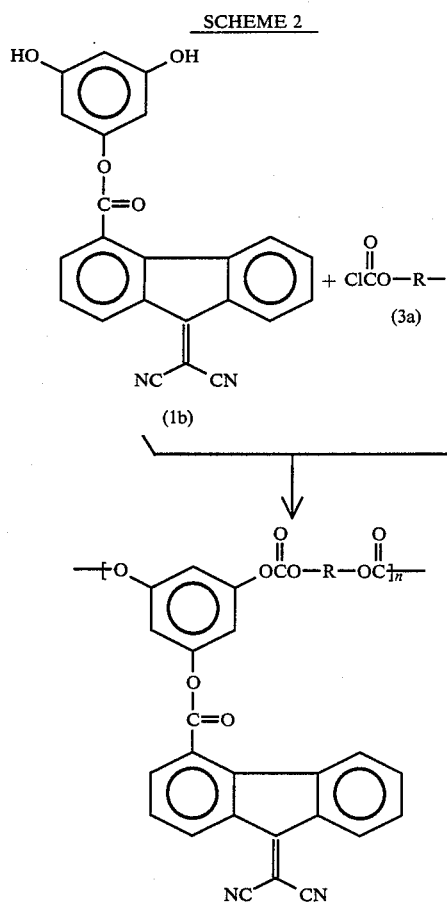

Examples of bishaloformates that may be employed for the polymerization include ethyleneglycol bischloroformate, propyleneglycol bischloroformate, butyleneglycol bischloroformate, diethyleneglycol bischloroformate, triethyleneglycol bischloroformate, and the like. Suitable solvents for the reaction include dichloromethane, 1,2-dichloroethane, tetrahydrofuran, dioxane, ethyl acetate, nitromethane, nitroethane, and the like.

The electron transporting polyurethanes of FIG. 4, for example, are obtained by reacting stoichiometric quantities of diol (1) such as (1a) with a diisocyanate (4) in an inert solvent at a temperature usually below 100° C., and preferably between 50° C. to 85° C. In general, a suitable catalyst such as trialkyl amine, dibutyltin diacetate or dibutyltin dilaurate is employed to speed up the polymerization. The preparation of polyurethanes can be described by the following reaction scheme:

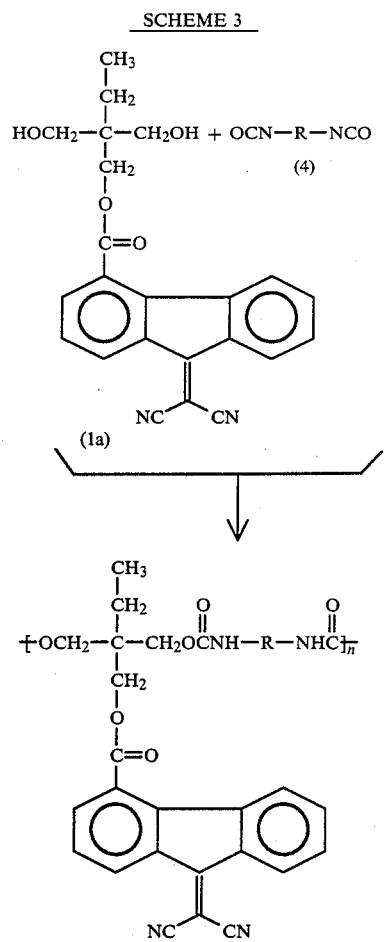

wherein R is as defined hereinbefore. Examples of suitable solvents for the above polymerization reaction include ethyl acetate, tetrahydrofuran, dioxane, dimethyl sulfoxide, dimethyl acetamide, and dimethylformamide. The reaction is generally conducted for 3 to 24 hours depending on the nature of the reagents and reaction conditions.

Examples of diisocyanates that may be selected for the preparation of electron transporting polyurethanes include methane diisocyanate, 1,2-ethane diisocyanate, 1,3-propane diisocyanate, 1,6-hexane diisocyanate, 1,4-cyclohexane diisocyanate, 1,4-dimethylenecyclohexane diisocyanate, phenylene diisocyanate, tolylene diisocyanates, methylene bis(4-phenyl isocyanate), and the like.

Specific examples of the functionalized monomer diols (1) selected for the reaction of the present invention include

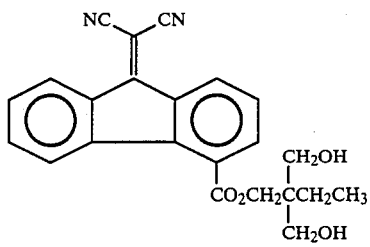

(1a) 2,2-Bis(hydroxymethyl)butyl 9-Dicyanomethylenefluorene-4-carboxylate

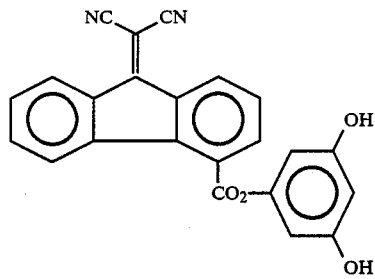

(1b) 3,5-Dihydroxyphenyl 9-Dicyanomethylenefluorene-4-carboxylate

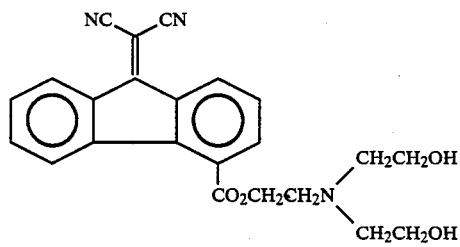

(1c) 2-[N,N-Bis(2-hydroxyethyl)amino]ethyl 9-Dicyanomethylenefluorene-4-carboxylate

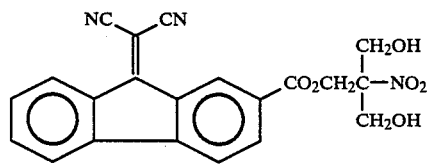

(1d) 3-Hydroxy-2-nitro-2-hydroxymethylpropyl 9-Dicyanomethylenefluorene-4-carboxylate

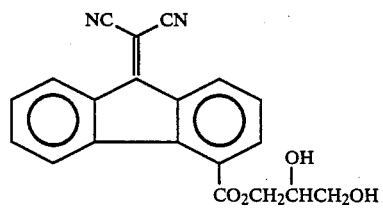

(1e) 2,3-Dihydroxypropyl 9-Dicyanomethylenefluorene-4-carboxylate

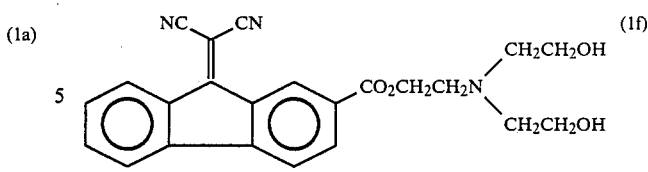

(1f) 2-[N,N-Bis(2-hydroxyethyl)amino]ethyl 9-Dicyanomethylenefluorene-4-carboxylate

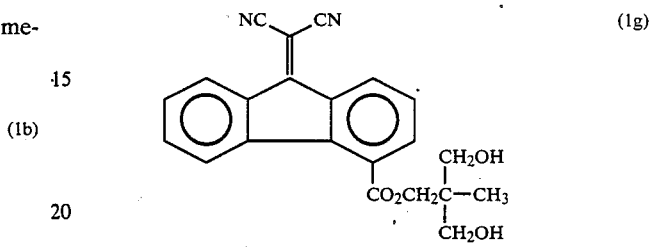

(1g) 2,2-Bis(hydroxymethyl)propyl 9-Dicyanomethylenefluorene-4-carboxylate

Electron transporting polymers illustrated herein and produced in accordance with the processes of the present invention can be identified by various analytical techniques including IR, NMR, GPC, elemental analysis, etc.

The electron transporting overcoatings are applied to the imaging members disclosed hereinafter in a thickness that will enable the objectives of the present invention to be achieved. Generally, the thickness of this layer is from 0.1 micron to about 10 microns, and preferably from about 0.5 micron to about 5 microns.

DESCRIPTION OF THE PREFERRED EMBODIMENTS

The invention will now be illustrated with reference to specific preferred embodiments wherein FIGS. 1 through 10 represent electron transporting compounds;

Figure 11:
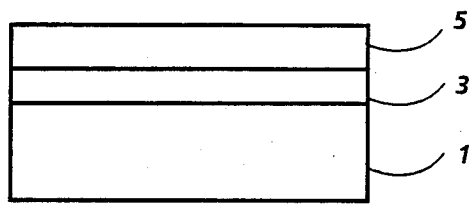
FIG. 11 represents a cross-sectional view of a photoresponsive imaging member of the present invention.

There is illustrated in FIG. 11 a photoresponsive imaging member of the present invention comprised of a supporting substrate 1, a photoconductive layer 3 comprised of a photogenerating compound, and as a protective overcoating 5, the electron transport polymers illustrated herein.

Figure 12:
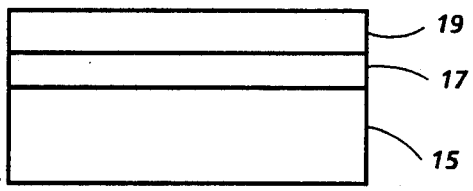
FIG. 12 represents a cross-sectional view of a preferred photoresponsive imaging member of the present invention.

Illustrated in FIG. 12 is a preferred photoresponsive imaging member of the present invention comprised of an aluminum supporting substrate 15, a selenium or selenium arsenic alloy photoconductive layer 17, and a top overcoating layer 19 comprised of the polyurethane electron transport polymer polyurethane (V) represented by the formula illustrated herein, and derived from the polycondensation of 2,2-bis(hydroxymethyl)-butyl 9-dicyanomethylenefluorene-4-carboxylate and tolylene diisocyanate.

Figure 13:
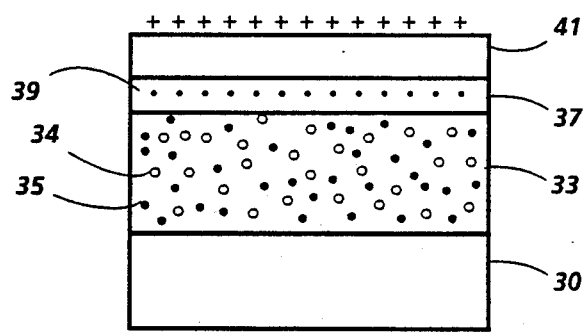
FIG. 13 represents a cross-sectional view of a preferred photoresponsive imaging member of the present invention.

Illustrated in FIG. 13 are positively charged layered photoresponsive imaging members comprised of a supporting substrate 30, an arylamine hole transport layer 33, comprised of a diamine 34 dispersed in an inactive resinous binder 35, a photogenerating layer 37 in contact therewith, optionally dispersed in a resinous binder 39, and a polyurethane top overcoating layer 41 comprised of the electron transport polyurethane (V) represented by the formula illustrated herein. Similarly, negatively charged layered imaging members are envisioned wherein the photogenerating layer is situated between the arylamine hole transport layer and the supporting substrate.

Figure 14:
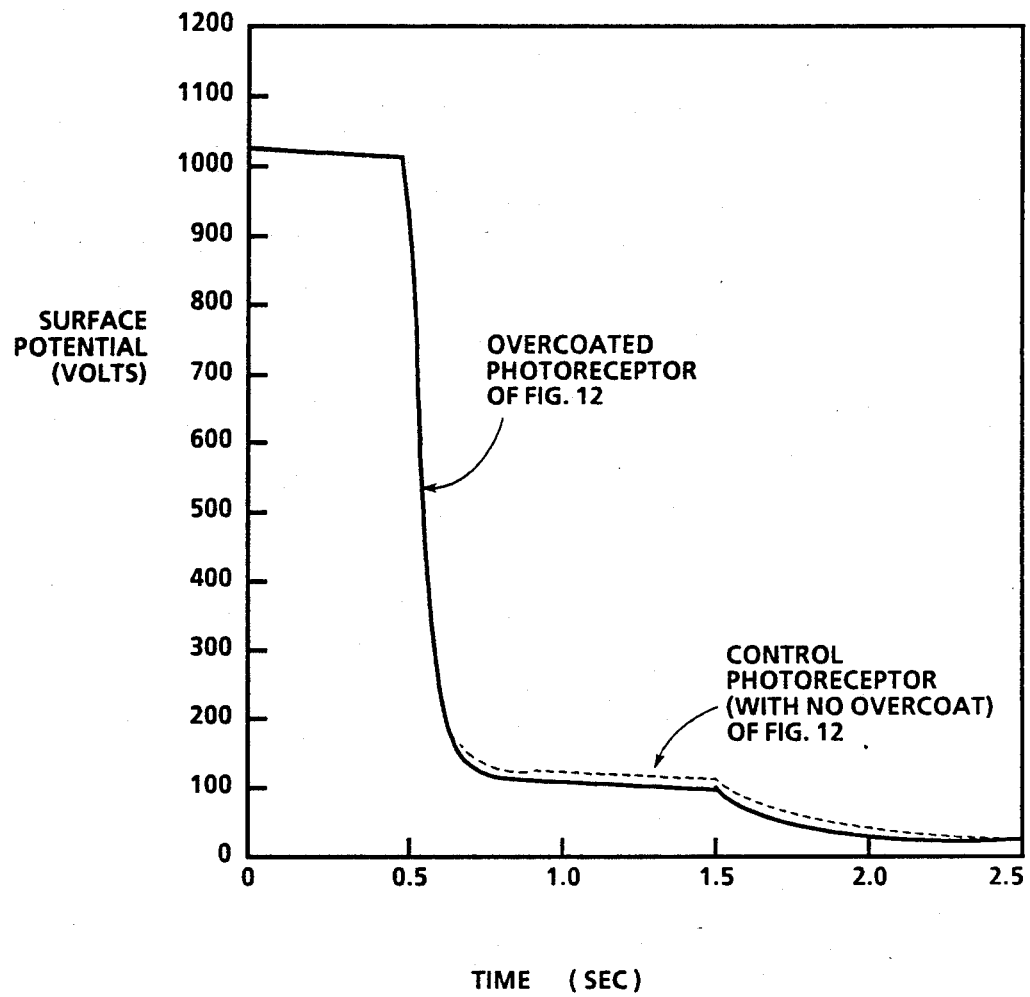
FIG. 14 represents line graphs for photoresponsive imaging members.

With reference to FIG. 14, the solid line represents a photoinduced discharge curve for the photoresponsive member of FIG. 12 with an overcoating; while the dotted line is a photoinduced discharge curve for the same photoresponsive member with no overcoating thereon.

With further reference to the photoresponsive imaging members illustrated herein, and particularly with reference to FIGS. 11 to 13, the substrates layers may be comprised of any suitable material having the requisite mechanical properties. Thus, the substrate layers may be comprised of a layer of conductive materials such as metallized organic polymeric materials, or inorganic materials such as, for example, aluminum, chromium, nickel, brass, or the like. The substrate may be flexible or rigid, and may be of a number of many different configurations, such as, for example, a plate, a cylindrical drum, a scroll, an endless flexible belt, and the like. Preferably, the substrate is in the form of an endless flexible belt or a rigid drum.

The photoconductive layers can be comprised of known photoconductive charge carrier generating materials including, for example, amorphous selenium, amorphous selenium alloys, halogen-doped amorphous selenium, halogen-doped amorphous selenium alloys, trigonal selenium, selenide and carbonates with trigonal selenium, reference U.S. Pat. Nos. 4,232,102 and 4,233,283, the disclosures of which are totally incorporated herein by reference, cadmium sulfide, cadmium selenide, cadmium telluride, cadmium sulfur selenide, cadmium sulfur telluride, cadmium seleno telluride, copper and chlorine-doped cadmium sulfide, and the like. Alloys of selenium included within the scope of the present invention include selenium tellurium alloys, selenium arsenic alloys, selenium tellurium arsenic alloys, and preferably such alloys containing the halogen material, such as chlorine, in an amount of from about 50 to about 200 parts per million.

Other photogenerating components include metal phthalocyanines; metal-free phthalocyanines; vanadyl phthalocyanines; other known phthalocyanines as disclosed in U.S. Pat. No. 3,816,118, the disclosure of which is totally incorporated herein by reference; squarylium pigments; and the like. Preferred photogenerating layers include trigonal selenium, squarylium pigments and vanadyl phthalocyanine.

With reference to FIGS. 11 and 12, the thickness of the substrate layers is generally from about 50 microns to about 5,000 microns, while the thickness of the photogenerating layer is from about 0.5 micron to about 5 microns, and the polyurethane electron transporting overcoating is of a thickness of from about 0.1 micron to about 10 microns, and preferably is of a thicknes of from about 0.5 micron to about 5 microns.

With respect to FIG. 13, layered photoresponsive imaging members are envisioned wherein the photogenerating pigment is usually selected from organic substances such as vanadyl phthalocyanines, and the hole transport layer is selected from various arylamine molecules as illustrated herein. Also, the electron transporting overcoatings of the present invention can be dispersed in highly insulating and transparent resinous material or inactive resinous binder material, including those as described in U.S. Pat. No. 3,121,006, the disclosure of which is totally incorporated herein by reference. Specific examples of resinous materials include polycarbonates, acrylate polymers, vinylpolymers, cellulose polymers, polyesters, polysiloxanes polyamides, polyurethanes, and epoxies, as well as block, random or alternating copolymers thereof. Preferred electrically inactive binder materials are polycarbonate resins having a molecular weight of from about 20,000 to about 100,000 with a molecular weight in the range of from about 50,000 to about 100,000 being particularly preferred. Generally, the resinous binder is present in the electron transporting layer in an amount of from about 25 percent by weight to about 75 percent by weight, and preferably from about 50 percent by weight to about 65 percent by weight. Other inactive resinous binder materials can be selected for the electron transporting overcoat providing the objectives of the present invention are achieved, including, for example, polyhydroxy ethers, such as those commercially available from Union Carbide, and the like.

Various hole transport layer compositions can be selected providing these substances are capable of transporting holes, this layer generally having a thickness in the range of from about 5 to about 50 microns, and preferably from about 20 to about 40 microns. Thus, the transport layer comprises arylamine molecules of the formula:

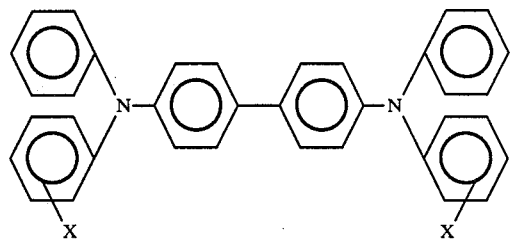

dispersed in a highly insulating and transparent organic resinous material wherein X is selected from the group consisting of alkyl, and halogen, preferably (ortho) CH$_3$, (meta) CH$_3$, (para) CH$_3$, (ortho) Cl, (meta) Cl, (para) Cl. The charge transport layer is substantially non-absorbing in the spectral region of intended use, that is, visible light, but is "active" in that it allows injection of photogenerated holes from the charge generator layer. The resin becomes electrically active when it contains from about 10 to 75 weight percent of the substituted N,N,N',N'-tetraphenyl-1,1'[biphenyl]-4-4'-diamines corresponding to the foregoing formula. Compounds corresponding to this formula include, for example, N,N'-diphenyl-N,N'-bis-(alkylphenyl)-1,1'-[biphenyl]-4,4'-diamine wherein alkyl is selected from the group consisting of methyl such as 2-methyl, 3-methyl and 4-methyl, ethyl, propyl, butyl, hexyl and the like. With halogen substitution, the compound is N,N'-diphenyl-N,N'bis(halophenyl)-1,1'-biphenyl-4,4'-diamine wherein the halogen atom is 2-chloro, 3-chloro or 4-chloro.

Other electrically active small molecules which can be dispersed in the electrically inactive resin to form a layer which will transport holes include triphenylamine, and bis-(4-diethylamino-2-methylphenyl)-phenylmethane, and bis-(4-diethylaminophenyl)-phenylmethane.

The invention will now be described in detail with respect to specific preferred embodiments thereof it being understood that these examples are intended to be illustrative only and the invention is not intended to be limited to the materials, conditions, and process parameters recited herein. All percentages and parts are by weight unless otherwise indicated.

EXAMPLE I

Synthesis of 2,2-Bis(hydroxymethyl)butyl 9-Dicyanomethylenefluorene-4-carboxylate(1a)

A mixture of 2.1 kilograms of trimethylolpropane, 173 grams of fluorenone-4-carboxylic acid and 8 milliliters of sulfuric acid was mechanically stirred and heated in a 5-liter flask at 100° C. for 5 hours. The mixture was cooled to about 80° C., and 1 liter of methanol was added. The resulting solution was poured slowly into 17 liters of 3 percent aqueous sodium bicarbonate solution with constant stirring. The crude product was filtered, washed several times with water, and dried. Purification by recrystallization from ethyl acetate afforded 187 grams of pure 2,2-bis(hydroxymethylbutyl)-fluorenone-4-carboxylate, mp., 134°-135.5° C.

A solution of 240 grams of the ester as obtained above, 93 grams of malononitrile and 5 milliliters of piperidine in 2.3 liter of absolute methanol was heated under reflux under a nitrogen atmosphere for 5 hours. After the reaction, the mixture was cooled to about 50° C., and the solid product was filtered. The (1a) product obtained was washed twice with methanol, dried in vacuo at 100° C. to afford 229 grams of pure (1a), mp., 208°-209° C.

Analysis Calculated for $C_{23}H_{20}N_2O_4$: C, 71.12; H, 5.19; N, 7.12, Found: C, 71.23; H, 5.21; N, 7.13, IR (KBr), cm$^{-1}$: 3420; 2230; 1730.

$^1$H MNR (DMSO-d$_6$), ppm: 0.85(t, 3H); 1.4(q, 2H); 3.4(d, 4H); 4.3 (s, 2H); 4.4 (t, 2H); 7.4–8.6(m, 7H).

EXAMPLE II

Synthesis of 3,5-Dihydroxyphenyl 9-Dicyanomethylenefluorene-4-carboxylate (1b)

A solution of 30.0 grams of phloroglucinol and 70 milliliters of pyridine in 300 milliliters of dichloromethane was stirred at room temperature under a nitrogen atmosphere. A solution of 8.0 grams of (4-chloroformyl-9-fluorenylidene)malononitrile in 400 milliliters of dichloromethane was added over a period of 1 hour. After addition, the reaction mixture was further stirred for another hour. The mixture was washed three times with dilute aqueous HCl solution, twice with dilute aqueous NaHCO$_3$ solution, and once with water. The solution was dried, filtered and evaporated under reduced pressure to give the crude product. Recrystallization from methanol afforded 6.1 grams of (1b), mp., 255.5°-257° C.

Analysis Calculated for $C_{23}H_{12}N_2O_4$: C, 72.63; H, 3.18; N, 7.37, Found: C, 72.41; H, 3.12; N, 7.17, IR (KBr), cm$^{-1}$: 3410; 2230; 1730.

$^1$H MNR (acetone-d$_6$), ppm: 3.25 (br s, 2H); 6.8 (s, 3H); 7.6–9.0 (m, 7H).

EXAMPLE III

Synthesis of 2-[N,N-Bis(2-hydroxyethyl)amino]ethyl 9-Dicyanomethylenefluorene-4-carboxylate (1c)

A solution of 100.0 grams of triethanolamine and 58 milliliters of dry pyridine in 350 milliliters of dry dichloromethane was stirred at room temperature under a nitrogen atmosphere. A solution of 8.0 grams of (4-chloroformyl-9-fluorenylidene)malononitrile in 400 milliliters of dry dichloromethane was added over a period of 1 hour. After addition, the reaction mixture was further stirred for another hour. The reaction mixture was washed several times with water to remove the excess amines and the corresponding hydrochloride salts, dried with anhydrous magnesium sulfate and filtered. Evaporation of the filtrate gave 5 grams of crude product. Purification by recrystallization from isopropanol afforded 4.5 grams of pure (1c), mp., 155.5°–156.5° C.

Analysis Calculated for $C_{23}H_{21}N_3O_4$: C, 68.48; H, 5.25; N, 10.42, Found: C, 68.31; H, 5.33; N, 10.35, IR (KBr), cm$^{-1}$: 3360; 2225; 1730.

$^1$H MNR (DMSO-d$_6$), ppm: 2.6 (t, 4H); 2.8 (t, 2H); 3.25 (br s, 2H); 3.4 (t, 4H); 4.4 (t, 2H); 7.4–8.6 (m, 7H).

EXAMPLE IV

Synthesis of Electron Transporting Polyester (I*) (*Formulas of Figures)

A mixture of 5.0 grams of monomer (1a) and 2.36 grams of adipoyl chloride was heated to 150° C. After heating for 10 minutes, the solid material dissolved with the evolution of HCl gas. A slow stream of dry nitrogen was then passed over the reaction mixture, and the latter was gradually heated to a final temperature of 190° C. over a period of 1 hour. After heating for another 2 hours, the reaction mixture was cooled down to room temperature, dissolved in 60 milliliters of chloroform, and poured into 500 milliliters of hexane. The polyester product was filtered and dried in vacuo. The yield was 6.25 grams; Tg, 73° C.

Elemental Analysis, Calculated for $C_{29}H_{26}N_2O_6$: C, 69.87; H, 5.26; N, 5.62; O, 19.26, Found: C, 69.69; H, 5.48; N, 5.57; O, 19.11.

IR (KBr), cm$^{-1}$: 2220; 1750; 1735.

$^1$H MNR (CDCl$_3$), ppm: 0.95 (t, 3H); 1.55 (m, 6H); 2.3 (br, 4H); 4.1 (s, 4H); 4.35 (s, 2H); 7.1–8.6 (m, 7H).

EXAMPLE V

Synthesis of Electron Transporting Polycarbonate (III)

A solution of 3.0 grams of monomer (1b), as obtained in Example II, and 2.0 grams of dry pyridine in 30 milliliters of dry dichloromethane was stirred at 10° C. under a nitrogen atmosphere. A solution of 1.82 grams of diethyleneglycol bischloroformate in 10 milliliters of dichloromethane was added dropwise over a period of 25 minutes. After addition, the reaction mixture was allowed to warm up to room temperature by itself. Stirring then was continued for another 3 hours. The mixture was washed once with aqueous dilute HCl solution, twice with water, dried with anhydrous MgSO$_4$, and filtered. The filtrate was concentrated to a final volume of about 25 milliliters, and precipitation from hexane yielded 2.5 grams of polycarbonate (III); Tg, 74° C.

Analysis Calculated for $C_{29}H_{18}N_2O_9$: C, 64.69; H, 3.37; N, 5.20; O, 26.74, Found: C, 64.15; H, 3.68; N, 4.80; O, 27.35.

IR (KBr), cm$^{-1}$: 2230; 1750–1735.

$^1$H MNR (CD$_2$Cl$_2$), ppm: 3.8 (br, 4H); 4.4 (br, 4H); 7.0–8.8 (m, 10H).

EXAMPLE VI

Synthesis of Electron Transporting Polyurethane (V)

A mixture of 70.0 grams of monomer (1a), as prepared in Example I, 31.39 grams of tolylene diisocyanate (mixture of 2,4- and 2,6-diisocyanates), and 0.2 gram of dibutyltin dilaurate in 700 milliliters of dry dimethylacetamide was heated under a nitrogen atmosphere at 75° C. for 5 hours. Five milliliters of absolute ethanol was added and the reaction was continued at the same temperature for another hour. After cooling down to room temperature, the reaction mixture was poured into 3,500 milliliters of methanol to precipitate the product polyurethane. The precipitate was filtered, washed with methanol, and dried in vacuo to give 96 grams of polyurethane (V); Tg, 152° C.

Elemental Analysis, Calculated for $C_{32}H_{26}N_4O_6$: C, 68.32; H, 4.66; N, 9.96; O, 17.06. Found: C, 68.69; H, 4.58; N, 9.83; O, 17.33.

IR (KBr), cm$^{-1}$: 3370; 2225; 1725.

$^1$H MNR (CDCl$_3$/5% TFA-d), ppm: 1.0 (br t, 3H); 1.5 (br, 2H); 2.2 (br s, 3H); 4.2–4.8 (2 br s, 6H); 6.8–8.6 (m, 12H).

EXAMPLE VII

Synthesis of Electron Transporting Polyurethane (VI)

The synthesis of polyurethane (VI) was carried out in accordance with the procedure of Example VI using monomer (1c) and p-phenylene diisocyanate instead of monomer (1a) and toluene diisocyanate. The yield of polyurethane (VI) was 92 percent; Tg, 108° C.

Elemental Analysis, Calculated for $C_{31}H_{25}N_5O_6$: C, 66.07; H, 4.47; N, 12.43; O, 17.03, Found: C, 65.32; H, 4.66; N, 12.13; O, 17.03.

IR (KBr), cm$^{-1}$: 3370; 2225; 1725, $^1$H MNR (DMSO-d$_6$): 1.0 (br t, 3H); 1.5 (br, 2H); 2.2 (br s, 3H); 4.2–4.8 (2 br s, 6H); 6.8–8.6 (m, 12H).

EXAMPLE VIII

Synthesis of Electron Transporting Polyurethane (VII)

The synthesis of polyurethane (VII) was carried out in accordance with the procedure of Example VI using monomer (1a) and p-phenylene diisocyanate in 94 percent yield; Tg, 158° C.

Elemental Analysis, Calculated for $C_{31}H_{24}N_4O_6$: C, 67.88; H, 4.41; N, 10.21; O, 17.50. Found: C, 67.66; H, 4.59; N, 10.21; O, 17.53.

IR (KBr), cm$^{-1}$: 3360; 2225; 1725, $^1$H MNR (CD$_2$Cl$_2$), ppm: 1.0 (t, 3H); 1.7 (br q, 2H); 4.4 (br s, 2H); 4.6 (2 br s, 2H); 7.0–8.7 (m, 13H).

EXAMPLE IX

A photoresponsive imaging member comprising a nickel plate coated with an alloy of selenium arsenic with 99.5 percent of selenium, and doped with 100 ppm of chlorine was overcoated with a layer of polyurethane (V). The solution for the overcoating was prepared by dissolving 2.0 grams of polyurethane (V) in 40 milliliters of tetrahydrofuran. This solution was coated over the selenium alloy layer by means of a Bird Film applicator. The coating was then dried in a forced air oven at 50° C. for 60 minutes and an overcoat of a dry thickness of 1.5 microns was obtained. The fabricated photoresponsive device was cooled to room temperature and electrically tested as follows:

The member was charged positively with corona, and discharged by exposing to white light of wavelengths of 400–700 nanometers. Charging was accomplished with a single wire corotron in which the wire was contained in a grounded aluminum channel and was strung between two insulating blocks. The acceptance potential of this imaging member after charging, and its residual potential after exposure were recorded. The procedure was repeated for different exposure energies, supplied by a 75 watt Xenon arc lamp of incident radiation, and the exposure energy required to discharge the surface potential of the member to half of its original value was determined. This surface potential was measured using a wire loop probe contained in a shielded cylinder and placed directly above the photoreceptor member surface. This loop was capacitively coupled to the photoreceptor surface so that the voltage of the wire loop corresponds to the surface potential. Also, the cylinder enclosing the wire loop corresponds to the surface potential. Also, the cylinder enclosing the wire loop was connected to the group.

For this imaging member the acceptance potential was 1,000 volts, the residual potential was 100 volts, and the half decay exposure sensitivity was 10 ergs/cm$^2$. These values are the same as those obtained for a similar device without the overcoating.

Further, the electrical properties of this photoreceptor member were essentially the same after 1,000 cycles of repeated charging and discharging.

Specifically, the electrical stability of the photoreceptor member was tested by monitoring the surface potentials for 1,000 cycles. Xerographic cycling is essentially the repetition of a photoinduced discharge experiment for a specific number of cycles. Each photoinduced discharge experiment constitutes a single cycle, and typically an individual cycle will include a charging, a dark decay period, exposure, a discharge period, and erasure by light of the remaining charge on the photoreceptor surface.

Electrostatic latent images can thus be generated on the photoconductive member of this Example, reference the $E_\frac{1}{2}$ value of 10 ergs/cm$^2$.

EXAMPLE X

Two identical organic photoresponsive imaging members were fabricated by coating a charge transport layer of a thickness of 15 microns on an aluminized Mylar substrate of a thickness of 50 microns. The transport layer was comprised of 50 percent N,N'-diphenyl-N,N'-bis(3-methylphenyl)-1-1'-[biphenyl]-4,4'-diamine dispersed in 50 percent by weight of Makrolon polycarbonate. Photogenerator layers, 0.5 micron in thickness, comprising 30 percent of vanadyl phthalocyanine dispersed in 70 percent by weight of polyester PE-100, available from Goodyear, were spray coated using a commercial spray gun. One of these fabricated imaging members was overcoated with a layer of polyurethane (VII) in accordance with the procedure of Example IX. The thickness of the overcoat was 2 microns. The other fabricated imaging member was left without an overcoat to serve as a control.

These two devices were then tested electrically by charging positively to a surface potential of about 800 volts and discharging by exposing to 830 nanometers monochromatic light. The results indicated that both devices possessed a similar acceptance potential and similar exposure sensitivity. However, the overcoated device displayed a dramatic improvement in its dark decay characteristics as compared to the control device as follows:

|  | Acceptance Potential V | Dark Decay V/S | Half-Decay Exposure Sensitivity (ergs/cm$^2$) |
| --- | --- | --- | --- |
| Control Device | 800 | 200 | 15 |
| Overcoated Device | 800 | 40 | 15 |

V/S = volts per second.

EXAMPLE XI

Figure 3:
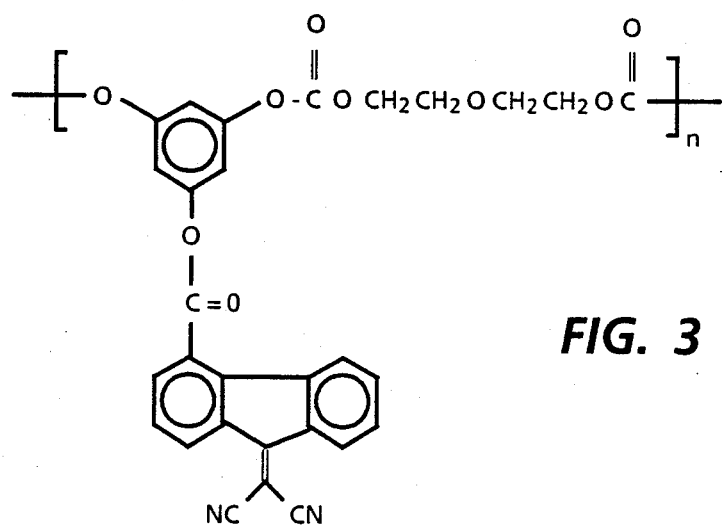
Figure 4:
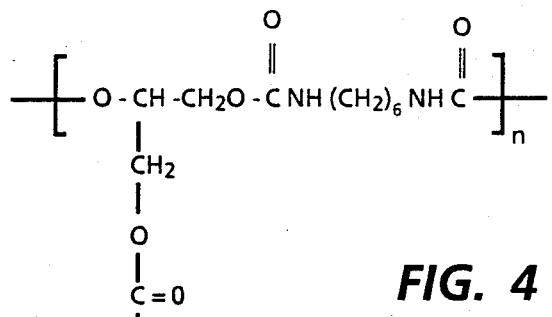
Figure 4:
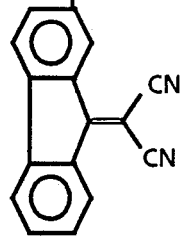

A photoresponsive imaging member comprising a ball grained aluminum plate of a thickness of 40 mils coated with a 60 microns thick layer of a selenium tellurium alloy was overcoated with a layer of polycarbonate of FIG. 3 compounds as follows:

A solution for the overcoating was prepared by dissolving 4.0 grams of polycarbonate (III), 1.0 gram of the diamine of Example VII in 50 milliliters of methylene chloride. The solution was coated over the selenium-tellurium photoconductive layer by means of a Bird Film applicator. The coating was dried in a forced air oven at 50° C. for 30 minutes resulting in a thickness of 1 micron. The overcoated photoresponsive imaging member was electrically tested in accordance with the procedure of Example IX. The results indicated that the xerographic performance of the overcoated device was inferior when compared to a similar or equivalent device without the overcoating. Specifically, the overcoated device displayed a consistently higher residual potential of 150 volts as compared to 100 volts for the non-overcoated control device.

EXAMPLE XII

A photoresponsive imaging member similar to that of Example X was prepared on a ball grained aluminum plate. Specifically, a photogenerator layer comprising trigonal selenium and the diamine of Example X dispersed in poly(N-vinylcarbazole) was coated on top of the diamine transport layer. The thickness of the transport layer was 15 microns and that of the photogenerator was 2 microns. An overcoat layer similar to that of Example IX was applied on top of the photogenerator layer by means of a Bird Film applicator. Electrical testing of this device was accomplished by repeating the procedure of Example IX, and substantially similar results were obtained.

Although the invention has now been described with reference to specific preferred embodiments, it is not intended to be limited thereto but rather those skilled in the art will recognize that variations and modifications may be made therein which are within the spirit of the invention and within the scope of the claims.

What is claimed is:

1. An imaging member comprised of a photoconductive layer, and a protective electron transport polymer overcoating of the formula

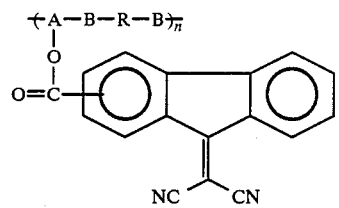

wherein A is a trivalent linkage; B is a functional group selected from the group consisting of an ester, carbonate, and carbamate; R is a bivalent linkage, and n represents the number of repeating units.

2. An imaging member in accordance with claim 1 wherein the photoconductive layer is comprised of selenium.

3. An imaging member in accordance with claim 1 wherein the photoconductive layer is comprised of selenium alloy.

4. An imaging member in accordance with claim 1 wherein the selenium alloy is selenium arsenic, or selenium tellurium.

5. An imaging member in accordance with claim 1 wherein R is an arylene group of 6 to 24 carbon atoms.

6. An imaging member in accordance with claim 1 wherein R is an aliphatic linkage of from 1 to about 10 carbon atoms.

7. An imaging member in accordance with claim 1 wherein R is tolylene function.

8. An imaging member in accordance with claim 1 wherein R is hexamethylene group.

Figure 1:
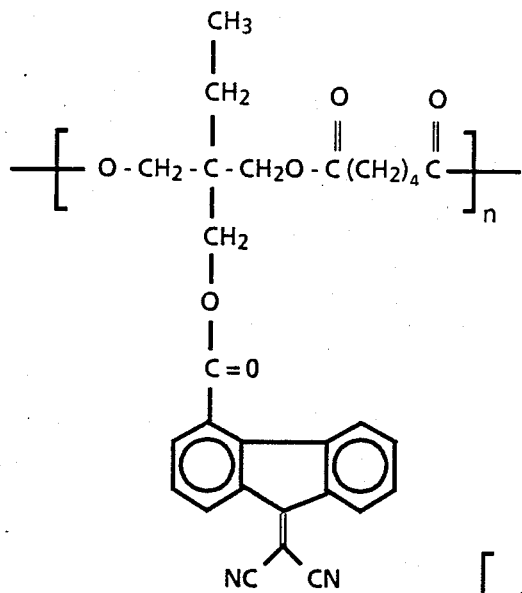
Figure 2:
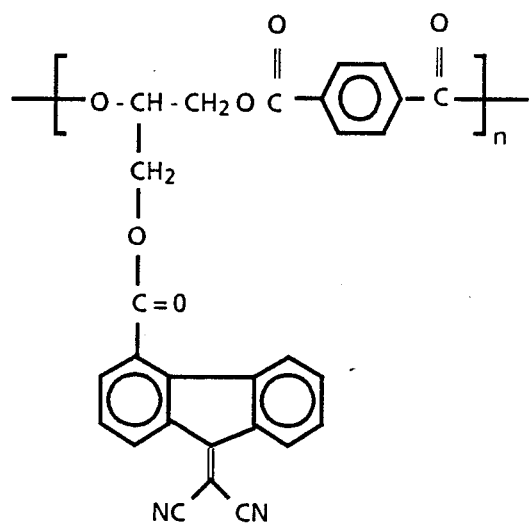

9. An imaging member in accordance with claim 1 wherein the electron transport overcoating polymer is polyester (FIG. 1).

10. An imaging member in accordance with claim 1 wherein the electron transport overcoating polymer is polycarbonate (FIG. 3).

Figure 5:
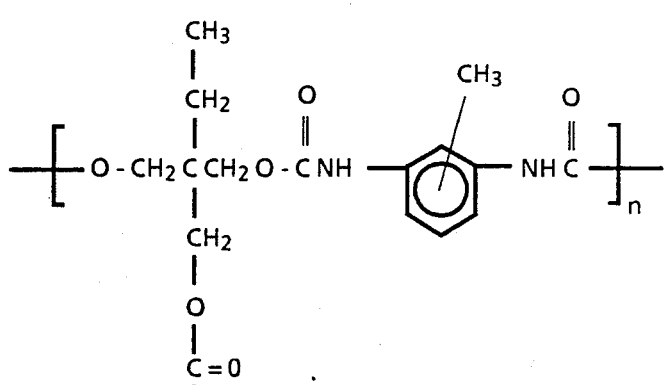
Figure 5:
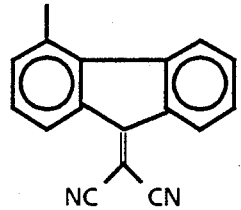
Figure 6:
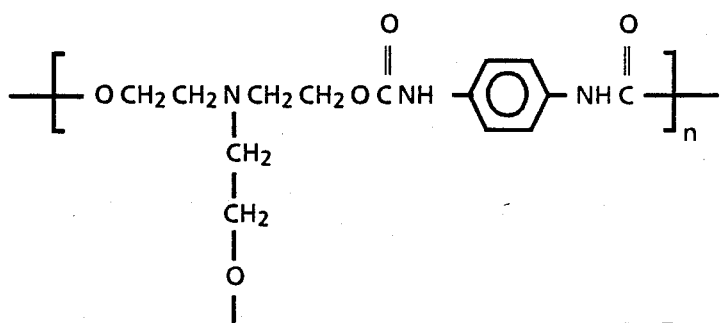
Figure 6:
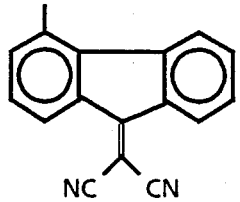

11. An imaging member in accordance with claim 1 wherein the electron transport overcoating polymer is polyurethane (FIG. 5).

Figure 7:
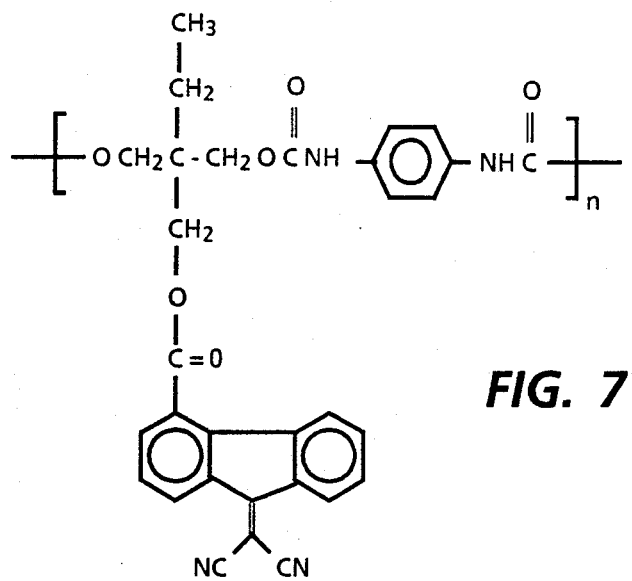
Figure 8:
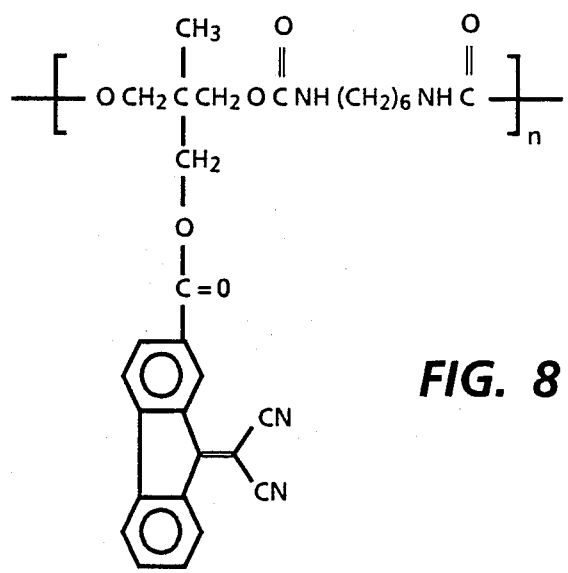
Figure 9:
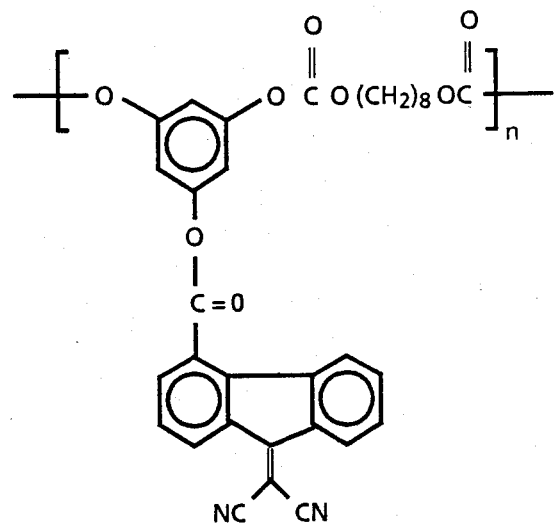
Figure 10:
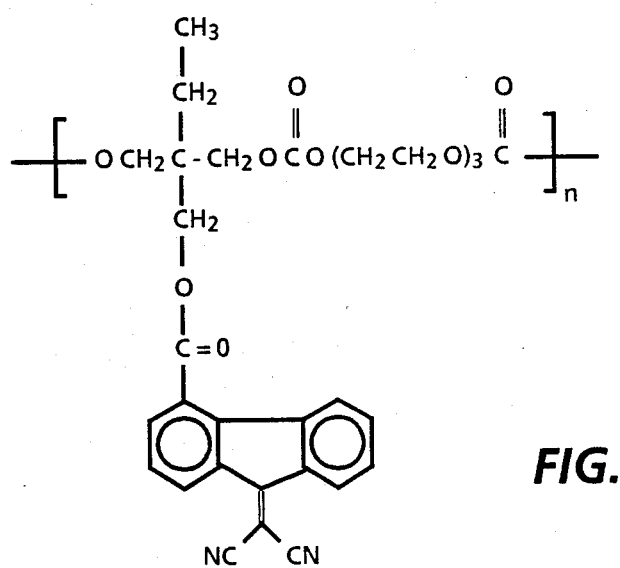

12. An imaging member in accordance with claim 1 wherein the electron transport overcoating polymer is polyurethane (FIG. 7).

13. An imaging member comprised of supporting substrate, a photogenerating layer comprised of organic photogenerating pigments optionally dispersed in a resinous binder, an arylamine hole transport layer, and as a protective overcoating an electron transport polymer of the following formula

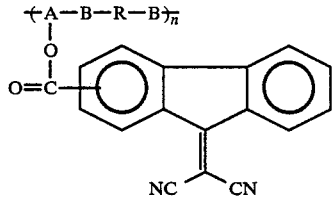

wherein A is a trivalent linkage; B is a functional group selected from the group consisting of an ester, carbonate, or N-carbamate; and R is a bivalent radical, and n represents the number of repeating units.

14. An imaging member in accordance with claim 13 wherein the organic photogenerating pigment is selected from the group consisting of metal phthalocyanines and metal free phthalocyanines.

15. An imaging member in accordance with claim 13 wherein the hole transporting compound is of the formula

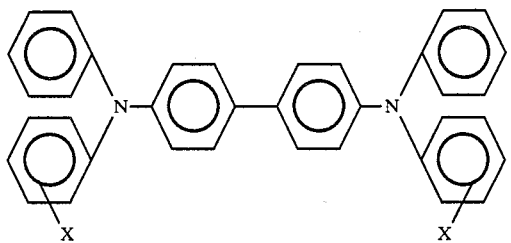

wherein X is an alkyl group, or halogen atom.

16. An imaging member in accordance with claim 13 wherein the overcoating is polyurethane (FIG. 5).

17. An imaging member comprised of a supporting substrate, an arylamine hole transport layer, a photogenerating layer comprised of organic photogenerating pigments optionally dispersed in a resinous binder, and as a protective overcoating an electron transport polymer of the following formula

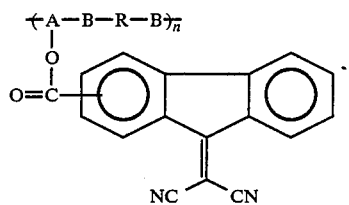

wherein A is a trivalent linkage; B is a functional group selected from the group consisting of an ester, carbonate, or N-carbamate; and R is a bivalent radical, and n represents the number of repeating units.

18. An imaging member in accordance with claim 17 wherein the organic photogenerating pigment is selected from the group consisting of metal phthalocyanines and metal free phthalocyanines.

19. An imaging member in accordance with claim 17 wherein the hole transporting compound is of the formula

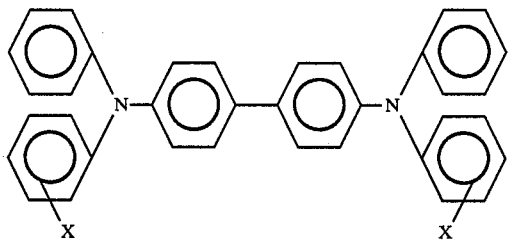

wherein X is an alkyl group, or halogen atom.

20. An imaging member in accordance with claim 17 wherein the overcoating is polyurethane (FIG. 5).

21. An imaging member consisting essentially of a photoconductive layer and a protective electron transport polymer overcoating selected from the group consisting of those represented by FIGS. 1 through 10.

22. An imaging member in accordance with claim 21 wherein the photoconductive layer is selected from the group consisting of amorphous selenium, amorphous selenium alloys, and halogen doped amorphous selenium alloys.

23. An imaging member consisting essentially of a supporting substrate, an arylamine hole transport layer, a photogenerating layer comprised of organic photogenerating pigments optionally dispersed in a resinous binder, and as a protective overcoating an electron transport polymer selected from the group consisting of those represented by FIGS. 1 through 10.

24. An imaging member in accordance with claim 23 wherein the organic photogenerating pigment is selected from the group consisting of metal phthalocyanine and metal free phthalocyanine.

25. An imaging member in accordance with claim 23 wherein the hole transporting compound is of the formula

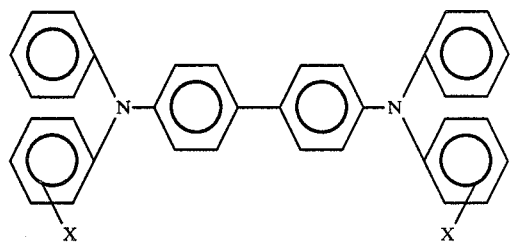

wherein X is an alkyl group, or halogen atom.

26. A method of imaging which comprises generating an image of the member of claim 1; developing said image; transferring the developed image to a suitable substrate; and thereafter affixing the image thereto.

27. A method of imaging which comprises generating an image of the member of claim 13; developing said image; transferring the developed image to a suitable substrate; and thereafter affixing the image thereto.

28. A method of imaging which comprises generating an image of the member of claim 17; developing said image; transferring the developed image to a suitable substrate; and thereafter affixing the image thereto.

29. A method in accordance with claim 26 wherein an electrostatic image is generated, developed, and transferred.

30. A method in accordance with claim 27 wherein an electrostatic image is generated, developed, and transferred.

31. A method in accordance with claim 28 wherein an electrostatic image is generated, developed, and transferred.

* * * * *